(12) United States Patent
Rodgers et al.

(10) Patent No.: US 8,953,305 B2
(45) Date of Patent: Feb. 10, 2015

(54) ELECTRICAL SWITCHING APPARATUS AND LEVERING ASSEMBLY THEREFOR

(71) Applicant: Eaton Corporation, Cleveland, OH (US)

(72) Inventors: Craig Allen Rodgers, Moon Township, PA (US); Nathan James Weister, Darlington, PA (US); Erik Russell Bogdon, Carnegie, PA (US)

(73) Assignee: Eaton Corporation, Cleveland, OH (US)

( * ) Notice: Subject to any disclaimer, the term of this patent is extended or adjusted under 35 U.S.C. 154(b) by 315 days.

(21) Appl. No.: 13/693,292

(22) Filed: Dec. 4, 2012

(65) Prior Publication Data

US 2014/0151207 A1  Jun. 5, 2014

(51) Int. Cl.
*H02B 11/12* (2006.01)
*H01H 3/06* (2006.01)
*H02B 11/127* (2006.01)

(52) U.S. Cl.
CPC ............... *H01H 3/06* (2013.01); *H02B 11/127* (2013.01)
USPC ........................................ 361/609; 200/50.24

(58) Field of Classification Search
CPC ........... H02B 11/127; H01H 6/03; H01H 9/22
USPC ............................... 200/50.24; 361/608–609
See application file for complete search history.

(56) References Cited

U.S. PATENT DOCUMENTS

| | | | |
|---|---|---|---|
| 3,681,545 A * | 8/1972 | Cellerini et al. | ........... 200/50.21 |
| 3,947,728 A | 3/1976 | Smith | |
| 4,017,698 A | 4/1977 | Kuhn et al. | |
| 4,233,643 A * | 11/1980 | Iverson et al. | ................. 361/616 |
| 4,317,160 A * | 2/1982 | Tillson et al. | ................. 361/609 |
| 4,447,858 A * | 5/1984 | Farag et al. | ................... 361/829 |
| 4,530,174 A * | 7/1985 | Hurt et al. | ....................... 37/423 |
| 4,761,521 A | 8/1988 | Beck et al. | |
| 5,453,587 A | 9/1995 | Hurley et al. | |
| 5,477,017 A | 12/1995 | Swindler et al. | |
| 5,822,165 A | 10/1998 | Moran | |
| 6,066,814 A * | 5/2000 | Smith et al. | ................. 200/50.24 |
| 6,504,693 B1 | 1/2003 | Moffat et al. | |
| 6,777,627 B1 | 8/2004 | Stevenson | |
| 6,897,388 B2 | 5/2005 | Greer | |
| 7,019,229 B1 | 3/2006 | Weister et al. | |
| 7,019,230 B1 | 3/2006 | Vaill et al. | |

(Continued)

FOREIGN PATENT DOCUMENTS

EP          2 431 988 A2      3/2012

OTHER PUBLICATIONS

European Patent Office, "International Search Report and Written Opinion", Jan. 2, 2014, 9 pp.

*Primary Examiner* — Gregory Thompson
(74) *Attorney, Agent, or Firm* — Eckert Seamans Cherin & Mellott, LLC; David C. Jenkins

(57) ABSTRACT

A drive shaft extension assembly is provided for an electrical switching apparatus which is removably disposed in a cassette. The electrical switching apparatus includes a levering assembly with a drive shaft. The drive shaft extension assembly includes a housing assembly, a shaft extension including an elongated body, and a racking gear. The shaft extension is structured to be coupled to the drive shaft in a fixed orientation, thereby increasing the width of the levering assembly.

19 Claims, 6 Drawing Sheets

(56) References Cited

U.S. PATENT DOCUMENTS

| | | |
|---|---|---|
| 7,485,817 B2 | 2/2009 | Gottschalk |
| 7,486,499 B2 | 2/2009 | Rambo et al. |
| 8,247,716 B2 | 8/2012 | Weister et al. |
| 8,420,964 B2 * | 4/2013 | Pearce et al. ............... 200/50.25 |
| 2009/0014291 A1 | 1/2009 | Stevenson |
| 2009/0301851 A1 | 12/2009 | Morris et al. |
| 2012/0067707 A1 | 3/2012 | Pollitt et al. |

* cited by examiner

ELECTRICAL SWITCHING APPARATUS AND LEVERING ASSEMBLY THEREFOR

BACKGROUND

1. Field

The disclosed concept relates generally to electrical switching apparatus and, more particularly, to electrical switching apparatus, such as circuit breakers. The disclosed concept also relates to a modular levering assembly for electrical switching apparatuses.

2. Background Information

Electrical switching apparatus used in power distribution systems are often mounted within a switchgear enclosure either individually or in combination with other switchgear (e.g., without limitation, circuit switching devices and circuit interrupters such as, but not limited to, circuit breakers, contactors, motor starters, motor controllers and other load controllers).

Some electrical switching apparatus such as, for example, some medium-voltage and low-voltage circuit breakers, can be relatively large. In order to facilitate movement (e.g., installation; removal; maintenance), some electrical switching apparatuses are commonly coupled to draw-out mechanisms which permit such electrical switching apparatuses to be drawn out of the switchgear enclosure. Accordingly, such electrical switching apparatuses are commonly known in the art as "draw-out" circuit breakers. The electrical switching apparatus may be further supported within a draw-out frame, commonly known in the art as a cassette or chassis. The switchgear enclosure generally includes a number of cells, with each cell being structured to receive a corresponding electrical switching apparatus. The draw-out mechanism includes, for example, a combination of rails and rollers coupled to one or the other, or both, of the sidewalls of the cell and the sides of the corresponding electrical switching apparatus and/or cassette, which is to be drawn into and out of the cell. A levering in assembly (sometimes referred to as a "lev-in" device), which among other components includes a drive screw and drive rack, facilitates levering the electrical switching apparatus into the cassette. Draw-out electrical switching apparatuses are described in further detail, for example, in commonly assigned U.S. Pat. No. 7,019,229. The levering in assemblies are sized to correspond to the electrical switching apparatus to which they are coupled. That is, an electrical switching apparatus has a width, which is typically a function of the number of poles which the electrical switching apparatus has. That is, the greater the number of poles, the wider the electrical switching apparatus. A levering in assembly, in a common embodiment, includes a drive shaft with gears on each end that engage the racking members disposed on the lateral sides of the cassette. Thus, the levering in assembly has a width substantially similar to the electrical switching apparatus. This is a disadvantage in that for each size electrical switching apparatus, a corresponding levering in assembly must be made.

There is, therefore, room for improvement in electrical switching apparatus, such as circuit breakers, and in levering assemblies. That is, there is a need for a levering in assembly that may be adapted for use with electrical switching apparatuses having different sizes. There is a further need for such a levering in assembly to operate with cassettes and other hardware presently in use.

SUMMARY

These needs and others are met by embodiments of the disclosed concept, which is directed to a modular levering assembly for an electrical switching apparatus, such as a electrical switching apparatus. That is, the modular levering assembly includes a base levering assembly of a first width as well as a drive shaft extension assembly that is coupled to the drive shaft of the base levering assembly.

As one aspect of the disclosed concept, a levering assembly is provided for an electrical switching apparatus. The electrical switching apparatus is structured to be removably disposed in a cassette, and includes a housing. The levering assembly includes: a mounting member structured to be coupled to the housing; a drive assembly coupled to the mounting member and being structured to cooperate with the cassette, the drive assembly includes an elongated laterally extending drive shaft; and an actuator coupled to the mounting member and being structured to actuate the drive assembly to move the electrical switching apparatus with respect to the cassette. The drive shaft includes a first shaft coupling component disposed at one of its ends. The drive shaft extension assembly includes a housing assembly, a shaft extension including an elongated body, and a racking gear. The shaft extension body has a first end and a second end and the shaft extension body first end includes a second shaft coupling component. The racking gear is coupled to the shaft extension body second end. The shaft extension body is rotatably disposed in the drive shaft extension assembly housing assembly. The second shaft coupling component is structured to be coupled to the first shaft coupling component with the drive shaft and the shaft extension being aligned. In this configuration, the shaft extension rotates with the drive shaft, effectively increasing the width of the base levering assembly.

An electrical switching assembly, which employs the aforementioned levering assembly is also disclosed.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

Figure 1:
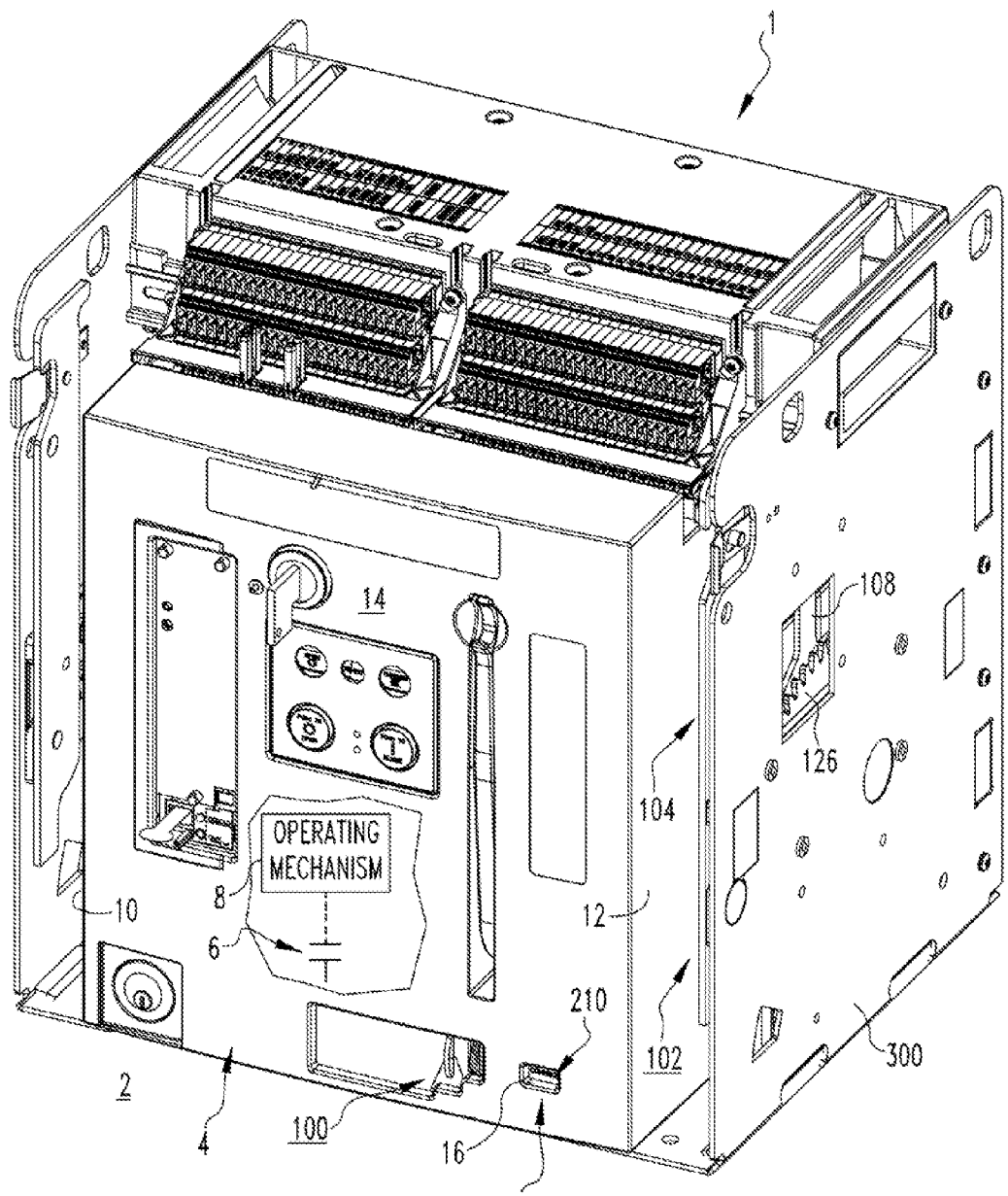
FIG. 1 is an isometric view of an electrical switching apparatus and levering assembly therefor, in accordance with an embodiment of the disclosed concept.
Figure 2:
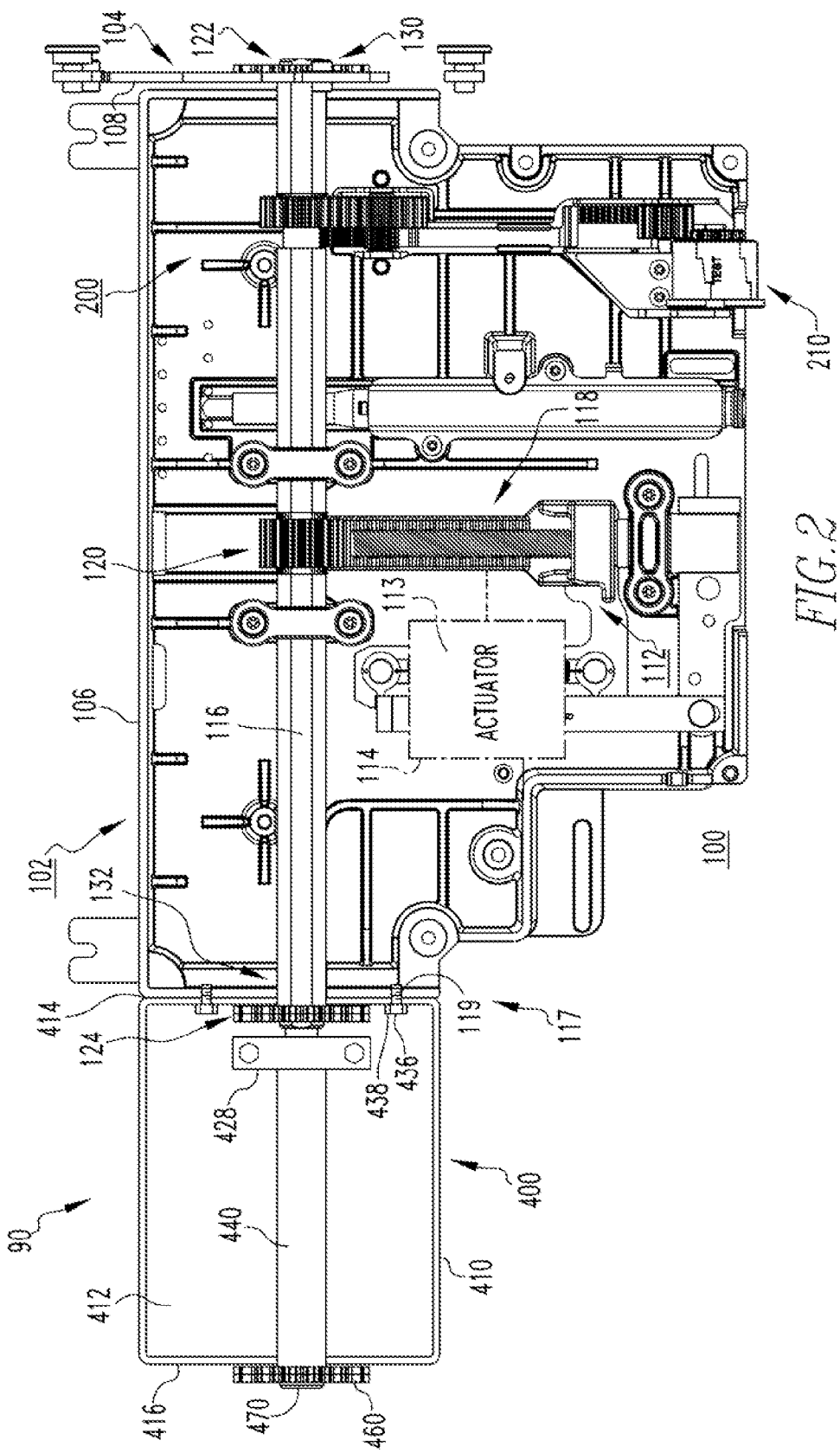
FIG. 2 is a top plan view of the levering assembly of FIG. 1, shown in the "connect" configuration.

As used herein, the singular form of "a," "an," and "the" include plural references unless the context clearly dictates otherwise. As used herein, the term "number" shall mean one or an integer greater than one (i.e., a plurality).

As used herein, the statement that two or more parts or components are "coupled" shall mean that the parts are joined or operate together either directly or indirectly, i.e., through one or more intermediate parts or components, so long as a link occurs. As used herein, "directly coupled" means that two elements are directly in contact with each other. As used herein, "fixedly coupled" or "fixed" means that two components are coupled so as to move as one while maintaining a constant orientation relative to each other. Similarly, two or more elements disposed in a "fixed relationship" means that two components maintain a substantially constant orientation relative to each other.

As used herein, the word "unitary" means a component is created as a single piece or unit. That is, a component that includes pieces that are created separately and then coupled together as a unit is not a "unitary" component or body. As employed herein, the statement that two or more parts or components "engage" one another shall mean that the parts exert a force against one another either directly or through one or more intermediate parts or components.

Directional phrases used herein, such as, for example and without limitation, top, bottom, left, right, upper, lower, front, back, and derivatives thereof, relate to the orientation of the elements shown in the drawings and are not limiting upon the claims unless expressly recited therein.

As used herein, "correspond" indicates that two structural components are similar in size, shape or function. With reference to one component being inserted into another component or into an opening in the other component, "corresponding" means components are sized to engage or contact each other with a minimum amount of friction. Thus, an opening which corresponds to a member is sized slightly larger than the member so that the member can pass through the opening with a minimum amount of friction. This definition is modified if the two components are said to fit "snugly" together. In that situation, the difference between the size of the components is even smaller whereby the amount of friction increases.

As used herein, a "coupling" or a "coupling component" is one element of a coupling assembly. That is, a coupling assembly includes at least two elements, or components, that are structured to be coupled together. It is understood that the elements of a coupling assembly correspond to each other or are otherwise structured to be joined together. For example, in a coupling assembly, if one coupling element is a bolt, the other coupling element is a nut. Further, it is understood that the two elements of a coupling assembly may not be described at the same time. Further, it is understood that, unless otherwise noted, the locations of two coupling components may be reversed. For example, if the coupling assembly includes a first coupling component, e.g. a lug, disposed on one element and a second coupling component, e.g. a socket, disposed on another element, the locations of the first and second coupling components may be reversed.

FIG. 1 shows a non-limiting example of an electrical switching assembly 1 including an electrical switching apparatus 2, such as, but not limited to, a circuit breaker 3, a levering assembly 90 (best shown in FIGS. 2-5), a cassette 300, and a drive shaft extension assembly 400 (FIGS. 2-5). The electrical switching apparatus 2 has a lateral width, i.e. a dimension extending generally perpendicular to the direction of travel into or out of the cassette 300, as described below. The lateral width of the electrical switching apparatus 2 is a function of the elements within the electrical switching apparatus 2, and more specifically the number of poles associated with the electrical switching apparatus 2. In this exemplary embodiment, it is assumed that the electrical switching apparatus 2 includes four poles. Conversely, an exemplary "base" electrical switching apparatus (not shown) has three poles and has a shorter lateral width than the electrical switching apparatus 2 shown. Thus, the "larger" electrical switching apparatus 2 has a greater lateral width than a "base" electrical switching apparatus (not shown). It is understood that the description of four- and three-pole electrical switching apparatuses are examples only and that a "base" electrical switching apparatus may have as few as one pole and that a "larger" electrical switching apparatus may have any number of poles greater than one.

The levering assembly includes a base levering assembly 100 and a shaft extension assembly 400. The "base" levering assembly 100 has a width corresponding to the width of a "base" electrical switching apparatus. That is, in the exemplary embodiment, the base levering assembly 100 has a width generally similar to a three-pole electrical switching apparatus. Again, it is understood that the description of the base levering assembly 100 having a width generally similar to a three-pole electrical switching apparatus is an example only and that the base levering assembly 100 may have a width similar to a single pole electrical switching apparatus.

The electrical switching apparatus 2 includes a housing 4, separable contacts 6 (shown in simplified form) enclosed by the housing 4, and an operating mechanism 8 (shown in simplified form) for opening and closing the separable contacts 6. In the example of FIG. 1, the electrical switching apparatus housing 4 includes first and second opposing, lateral sides 10, 12 and a cover 14 having a window 16 through which an indicator 210 of a position indicator assembly 200 can be seen, in order to readily determine the configuration (e.g., position) of the electrical switching apparatus 2 with respect to the cassette 300. That is, the base levering assembly 100 enables the electrical switching apparatus 2 to be racked or levered into and out of the cassette 300 such that it is movable among a plurality of positions. For example and without limitation, the indicator 210 of the position indicator assembly 200 shown and described herein is in the form of "connect," "disconnect" and "test" labels corresponding to the positions of the electrical switching apparatus 2 with respect to the cassette 300, shown in FIGS. 1-3, 4 and 5, respectively.

Figure 3:
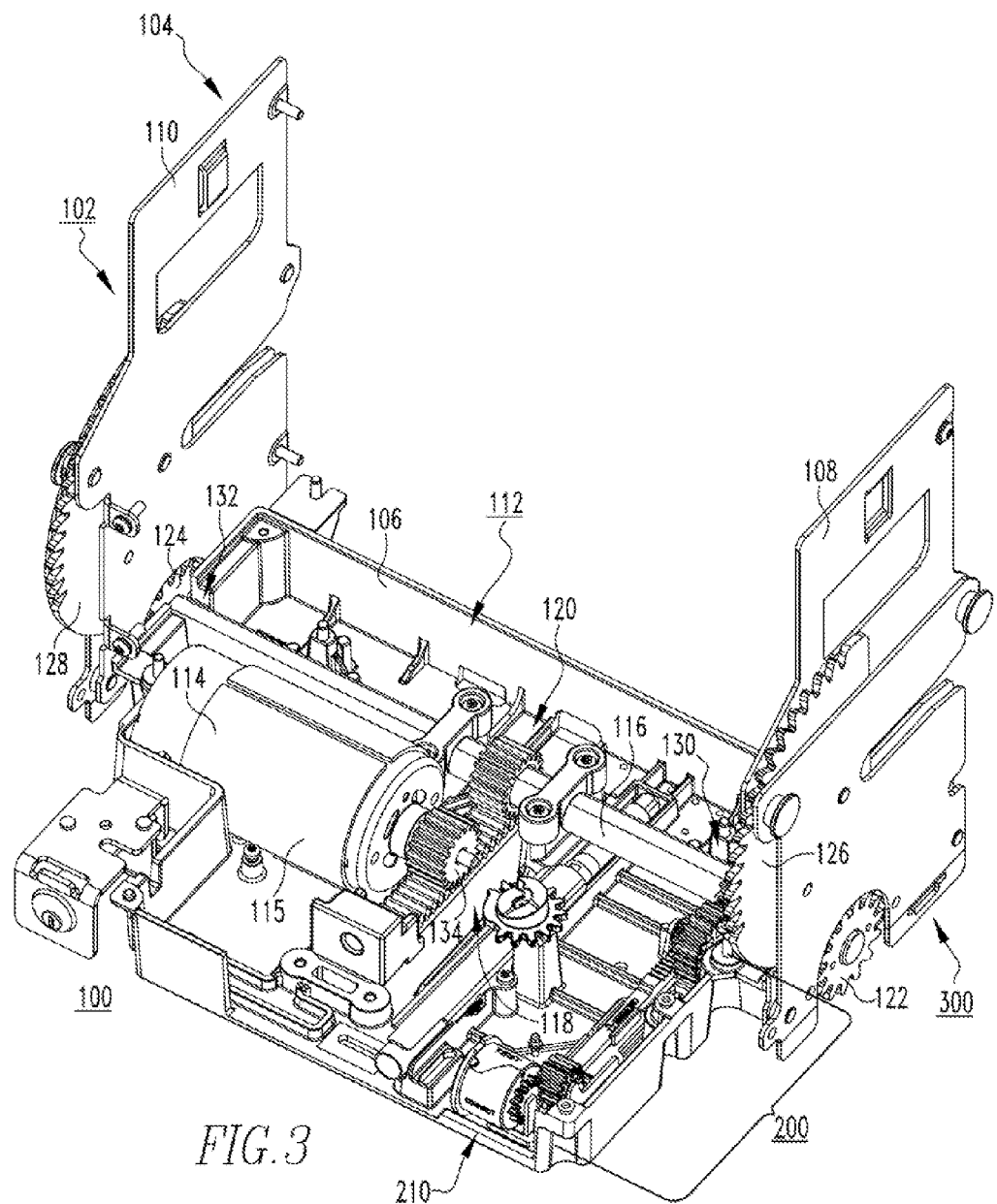
FIG. 3 is an isometric view of the levering assembly and an electric motor therefor, in accordance with an embodiment of the disclosed concept.
Figure 4:
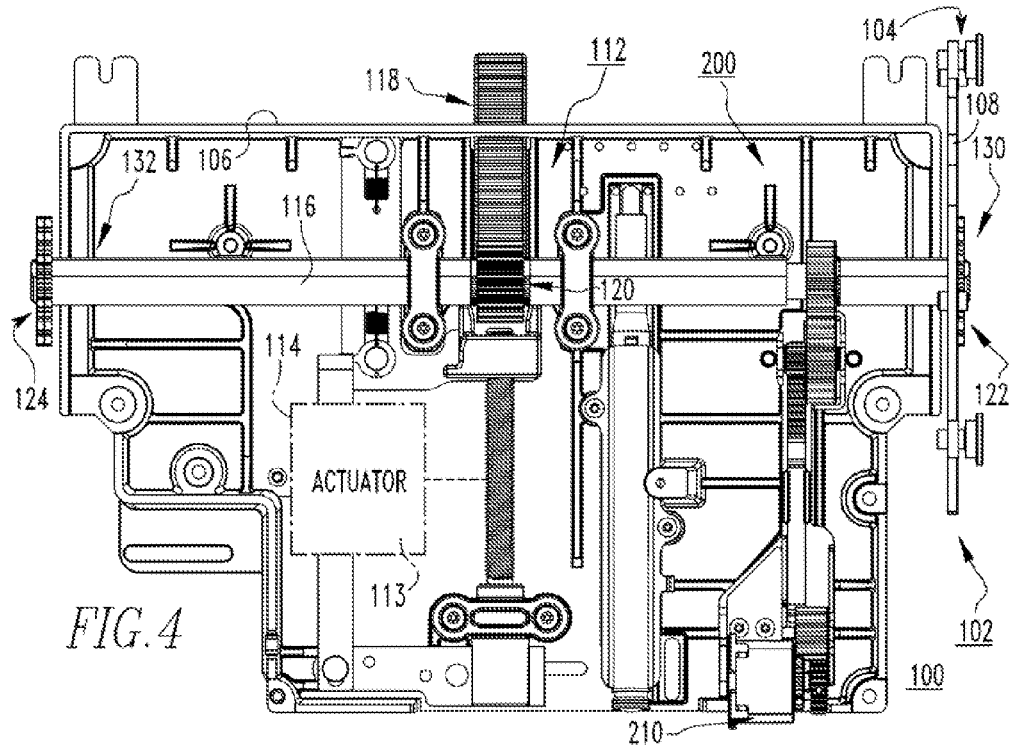
FIG. 4 is a top plan view of the levering assembly, shown in the "disconnect" configuration.
Figure 5:
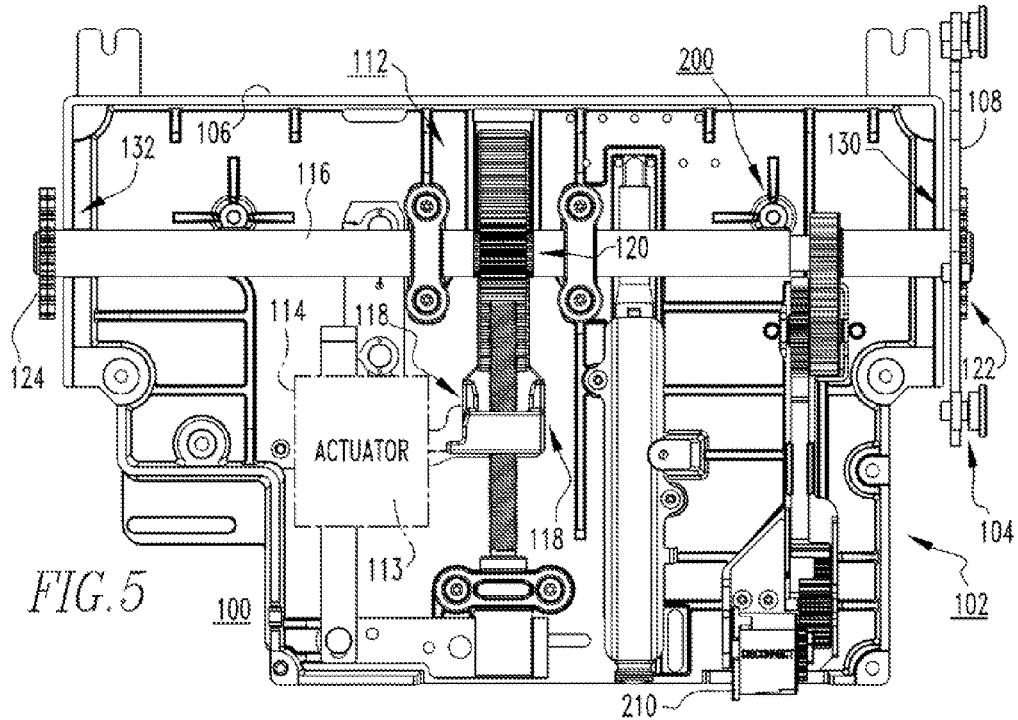
FIG. 5 is a top plan view of the levering assembly of FIG. 4, shown in the "test" configuration.

As shown in FIGS. 2-5, the base levering assembly 100 preferably includes a mounting member 102, which is suitably coupled to the electrical switching apparatus housing 4 (FIG. 1). A drive assembly 112 is coupled to the mounting member 102 and cooperates with the cassette 300 (FIG. 1; also partially shown in FIG. 3). An actuator 113, which is shown as a powered actuator 114 (see FIG. 3; also shown in simplified form in phantom line drawing in FIGS. 2, 4 and 5) is coupled to, or disposed on, the mounting member 102, and is structured to actuate the drive assembly 112 to move an electrical switching apparatus 2 with respect to the cassette 300 (FIGS. 1 and 3). That is, the powered actuator 114 is, preferably, disposed within the electrical switching apparatus housing 4. In an alternative embodiment, not shown, the actuator 113 is a manual actuator that may be selectively coupled to the drive assembly 112 to move electrical switching apparatus 2 with respect to the cassette 300. That is, actuator 113 may includes a drive screw (not shown) that is structured to actuate the drive assembly 112 and which is manually operated with a hand tool (not shown). Thus, the disclosed base levering assembly 100 provides a mechanism for effectively racking or levering an electrical switching apparatus 2 into and out of the cassette 300 (FIGS. 1 and 3), or to any desired position with respect to the cassette 300 (FIGS. 1 and 3).

As shown in FIG. 3, the drive assembly 112 of the exemplary base levering assembly 100 includes a drive shaft 116, a plurality of gears 118, 120, 122, 124, (the nature of the specific gears are discussed below) and a number of racking members 126, 128. The racking members 126,128 are movably coupled to the cassette 300. The powered actuator 114, which in the non-limiting example of FIG. 3, is an electrical motor 115, is operable to move the gears 118, 120, 122, 124 and the drive shaft 116, thereby moving the racking members 126, 128 to rack an electrical switching apparatus 2 into or out of the cassette 300 (FIG. 1). The mounting member 102 of the example base levering assembly 100 includes a frame 104 and a mount 106, wherein the mount 106 extends between opposing first and second lateral sides 108, 110 of the frame 104, as shown. The drive shaft 116 is pivotably coupled to the mount 106 and the electric motor 115 is disposed on the mount 116 proximate to the drive shaft 116. One, or both, frame first and second lateral sides 108, 110 includes a first housing coupling component 117. As shown, the first housing coupling component 117 is a plurality of threaded openings 119.

In the example of FIG. 3, the gears of the drive assembly 112 include a drive rack 118, a drive gear 120 and first and second racking gears 122, 124. More specifically, the drive shaft 116 includes first and second opposing ends 130, 132. The first racking gear 122 is coupled to the drive shaft 116 at or about the first end 130, and the second racking gear 124 is coupled to the drive shaft 116 at or about the second end 132. The drive gear 120 is also coupled to the drive shaft 116, between the first and second ends 130, 132. Accordingly, it will be appreciated that, in operation, the first racking gear 122 engages and moves the first racking member 126, and the second racking gear 124 engages and moves the second racking member 128.

Figure 6:
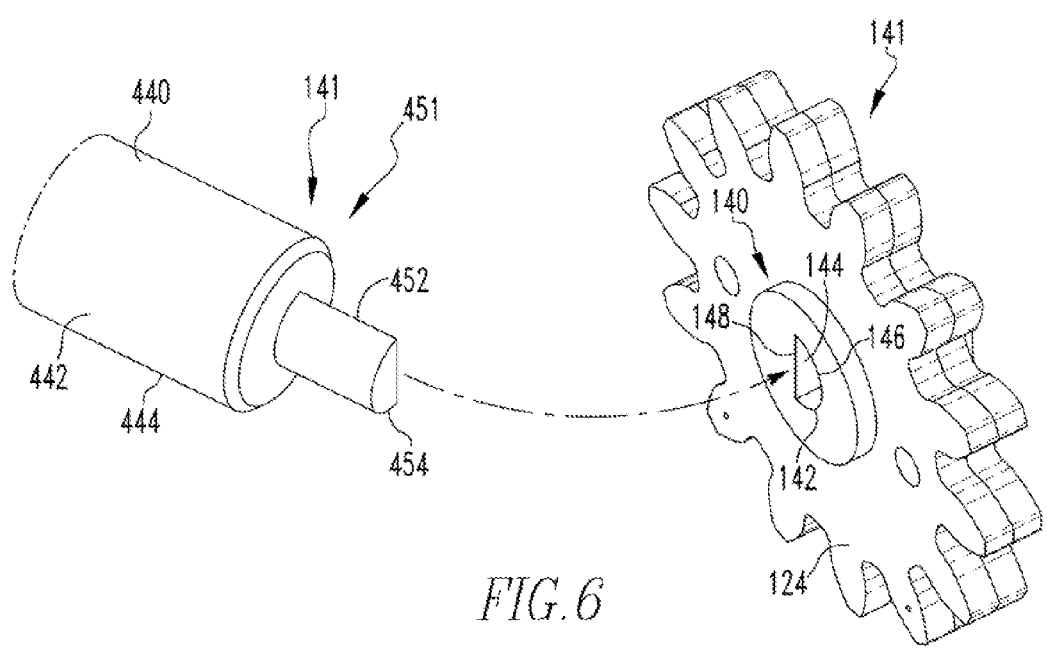
FIG. 6 is a detailed exploded view of a fixed orientation coupling.

Further, one, or both, of the drive shaft first and second ends 130, 132 includes a first shaft coupling component 140. As shown in FIG. 6, the first shaft coupling component 140 is disposed at the drive shaft second end 132. It is understood that this is an exemplary embodiment and that the first shaft coupling component 140 may be disposed at one, or both, of the drive shaft first and second ends 130, 132. Further, as shown in FIG. 6, the first shaft coupling component 140 is a fixed orientation coupling component 141. That is, the first shaft coupling component 140 has a cross-sectional shape other than circular. In this configuration, and when the first shaft coupling component 140 is coupled to a second shaft coupling component 450 (discussed below), the two shaft coupling components 140, 450 cannot rotate relative to each other. The fixed orientation coupling component 141 may be any non-circular shape such as, but not limited to, hexagonal, D-shaped, square, and similar shapes. In another embodiment, not shown, a circular lug with a pin may be used. That is, the lug and socket are generally circular, but a pin extends radially therethrough thereby maintaining the elements in a fixed orientation to each other.

In an exemplary embodiment, first shaft coupling component 140 is a non-circular socket 142, and more specifically a D-shaped socket 144. D-shaped socket 144 includes a circular portion 146 and a non-circular portion 148. In the exemplary embodiment, the non-circular portion 148 is a flat surface similar to chord of the circular portion 146. It is noted that drive shaft second end 132 may extend axially beyond second racking gear 124. As used herein, a "D-shaft coupling component" is a shaft coupling component 140, 450 having a D-shaped cross-section. Thus, in the exemplary embodiment, non-circular socket 142 is a "D-shaft coupling component." As described below, a lug 452 corresponding to non-circular socket 142 is also provided. That is, in the exemplary embodiment, lug 452 is a D-shaped lug 454, i.e. a "D-shaft coupling component," that corresponds to D-shaped socket 144.

The electric motor 115 includes a pinion 134. When the electric motor 115 is actuated, the pinion 134 pivots, thereby moving the drive rack 118. The drive rack 118 then moves the drive gear 120, thereby pivoting the drive shaft 116 and the first and second racking gears 122,124 coupled to the first and second ends 130,132, respectively, thereof. This, in turn, moves the racking members 126,128, which are movably coupled to the sides of the cassette 300 (FIG. 1). Consequently, movement of an electrical switching apparatus 2 with respect to the cassette 300 (FIG. 1) by way of the base levering assembly 100 is initiated by the actuator 113 (e.g., without limitation, electric motor 115) within the electrical switching apparatus 2 (FIG. 1), and is controlled to rack or lever a electrical switching apparatus 2 into or out of any desired position with respect to the cassette 300 (FIG. 1). It will be appreciated that any known or suitable alternative type and/or configuration of powered actuator (not shown) other than the electric motor 115 and pinion 134 could be employed to initiate movement of the electrical switching apparatus 2 (FIG. 1) from within the electrical switching apparatus 2 (FIG. 1), without departing from the disclosed concept.

Figure 7:
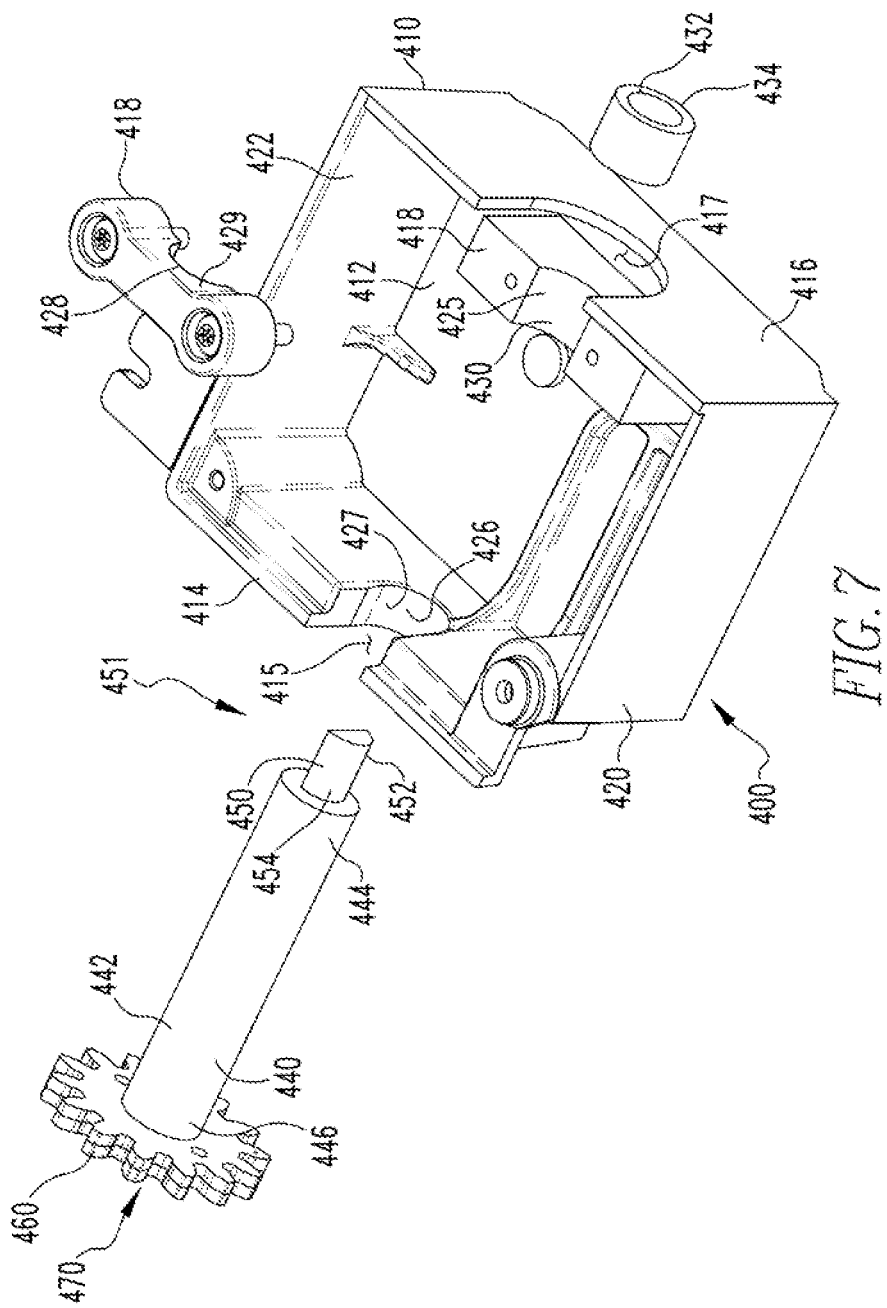
FIG. 7 is an exploded view of a drive shaft extension assembly.

Thus, the base levering assembly 100 is structured to operate with an electrical switching apparatus 2 having a similar lateral width. The base levering assembly 100 may be adapted for use with a larger electrical switching apparatus 2 via the drive shaft extension assembly 400, shown in FIG. 7. That is, the drive shaft extension assembly 400 includes a housing assembly 410, a shaft extension 440, and a racking gear 460. The drive shaft extension housing assembly 410 includes a base member 412, a first lateral sidewall 414, a second lateral sidewall 416, and a mounting assembly 418. The drive shaft extension housing assembly 410 may further include a front sidewall 420 and a rear sidewall 422. Each drive shaft extension housing assembly sidewall 414, 416, 420, 422 depend from and extend upwardly from the drive shaft extension housing assembly base member 412. The first lateral sidewall 414 and the second lateral sidewall 416 each include an opening 415, 417 sized to allow the shaft extension 440 to pass therethrough.

The mounting assembly 418 is structured to rotatably support the shaft extension 440. Thus, as shown, in an exemplary embodiment, the mounting assembly 418 includes a first plain bearing 424 having a partially circular bearing surface 425 and a second plain bearing 426 having a partially circular bearing surface 427. The mounting assembly 418 may include an upper plain bearing 428 structured to be fixed to one of the plain bearings 424, 426 (as shown and as discussed hereinafter; first plain bearing 424 is used as an example). The upper plain bearing 428 includes a partially circular bearing surface 429 so that when upper plain bearing 428 is coupled to first plain bearing 424 a circular opening (not shown) is formed.

Mounting assembly 418 may further include a bushing 432. Bushing 432 includes is a hollow, substantially circular body 434 having an outer diameter substantially corresponding to the diameter of circular opening 430 and an inner shape substantially corresponding to the diameter of shaft extension body 442 or drive shaft second end 132.

The housing assembly 410 further includes a second housing coupling component 436 (FIG. 1). As shown, second housing coupling component 436 includes a plurality of bolts 438 extending through first lateral sidewall 414. The second housing coupling component 436 is structured to be coupled to the first housing coupling component 117. That is, the plurality of threaded openings 119 and the bolts 438 are disposed in a corresponding pattern.

Shaft extension 440 includes an elongated body 442. In an exemplary embodiment, shaft extension body 442 is substantially circular. Shaft extension body 442 includes a first end 444 and a second end 446. The shaft extension body first end 444 includes a second shaft coupling component 450 (FIG. 6). The second shaft coupling component 450 is structured to be coupled to the first shaft coupling component 140. The second shaft coupling component 450 is, therefore, also a fixed orientation coupling component 451. In an exemplary embodiment, the second shaft coupling component 450 is a lug 452 corresponding to non-circular socket 142. That is, in the exemplary embodiment, lug 452 is a D-shaped lug 454, i.e. a "D-shaft coupling component". As shown, lug 452 has a diameter that is smaller than the diameter of shaft extension body 442. In this configuration, drive shaft second end 132 which, in an exemplary embodiment extends axially beyond second racking gear 124, may be disposed over D-shaped lug 454.

In another embodiment, not shown, both the first and second shaft coupling components 140, 450 components are sockets. In this embodiment an additional lug (not shown), which is not unitary with, or fixed to, either drive shaft 116 or shaft extension 440 is provided. The additional lug has a length that is longer than the depth of either individual socket; thus, when the lug is disposed in one socket, it extends outwardly therefrom. The sockets and separate lug have corresponding shapes and are non-circular as described above. In this configuration, when the first and second shaft coupling components 140, 450 components, i.e. the sockets, are brought together with the lug disposed in the sockets, the drive shaft 116 or shaft extension 440 are maintained in a fixed relationship and rotate together. In yet another embodiment, the first and second shaft coupling components 140, 450 components are both non-circular lugs (not show) and a separate elongated sleeve (not shown) is provided. The sleeve may have a generally circular outer surface and may act in a manner similar to bushing 432 described above. The sleeve includes two axial sockets, or a passage, that corresponds to the lugs. In this configuration, when the first and second shaft coupling components 140, 450 components, i.e. the lugs, are disposed in the sleeve sockets, the drive shaft 116 or shaft extension 440 are maintained in a fixed relationship and rotate together. As used herein, the separate lug or separate sleeve shall be considered to be part of the first shaft coupling component 140.

The drive shaft extension assembly racking gear 460 is substantially similar to the first and second racking gears 122, 124. The drive shaft extension assembly racking gear 460 is coupled to, and in an exemplary embodiment fixed to, the shaft extension body second end 446. Further, the shaft extension body second end 446 may include a secondary coupling component 470. The secondary coupling component 470 is substantially similar to the first shaft coupling component 140.

In this configuration, the levering assembly 90 is assembled as follows. The first plain bearing 424 and the second plain bearing 426 are coupled to, and in an exemplary embodiment fixed to, base member 412 each adjacent to one of first lateral sidewall 414 and second lateral sidewall 416. More specifically, the first plain bearing bearing surface 425 and the second plain bearing surface 427 are disposed adjacent to the first and second sidewall openings 415, 417. The shaft extension body 442 is disposed in the mounting assembly 418. That is, the shaft extension body 442 is disposed in the first and second plain bearings 424, 426 and may be secured by upper plain bearing 428 as described above. In this configuration, drive shaft extension assembly racking gear 460 is disposed outside of second lateral sidewall 416 and the shaft extension body first end 444 is disposed adjacent to first lateral sidewall 414 and, more specifically, adjacent to first sidewall opening 415. Bushing 432 may be disposed over D-shaped lug 454.

The housing assembly 410 is then moved into position adjacent frame second lateral side 110 and drive shaft second end 132. That is, the two shaft coupling components 140, 450 are brought together and coupled. In the exemplary embodiment, D-shaped lug 454 is disposed in corresponding D-shaped socket 144. As noted above, drive shaft second end 132 extends axially beyond second racking gear 124 and into housing assembly 410. The first housing coupling component 117 and the second housing coupling component 436 are coupled thereby fixing housing assembly 410 to frame 104. In this configuration, shaft extension body 442 is in a fixed orientation relative to drive shaft 116 and is aligned therewith. More specifically, in this configuration, the drive shaft 116 and the shaft extension body 442 are in-line. Thus, as drive shaft 116 rotates, as described above, so does shaft extension body 442. Accordingly, the effective lateral width of a base levering assembly 100 has been increased.

In an exemplary embodiment, shaft extension body 442, and therefore drive shaft extension assembly 400, has a lateral width substantially corresponding with the width of one of a single pole electrical switching apparatus 2, a two-pole electrical switching apparatus 2, a three-pole electrical switching apparatus 2, or a four-pole electrical switching apparatus 2. In this configuration a base levering assembly 100 may be structured to operate with a larger electrical switching apparatus 2. For example, if base levering assembly 100 has a lateral width corresponding to a three-pole electrical switching apparatus 2, then a drive shaft extension assembly 400 having a lateral width corresponding to a single pole electrical switching apparatus 2 may be coupled to the base levering assembly 100, as described above, so that the levering assembly 90 may be utilized with a four-pole electrical switching apparatus 2. As a further example, if base levering assembly 100 has a lateral width corresponding to a four-pole electrical switching apparatus 2, then a drive shaft extension assembly 400 having a lateral width corresponding to a four-pole electrical switching apparatus 2 may be coupled to the base levering assembly 100, as described above, so that the levering assembly 90 may be utilized with a eight-pole electrical switching apparatus 2. It is understood that other combinations are possible as well.

In an alternate embodiment, wherein each shaft extension body 442 includes a secondary coupling component 470, multiple drive shaft extension assemblies 400, may be used to increase the width of the base levering assembly 100. That is, a first drive shaft extension assembly 400 is coupled to the base levering assembly 100 as described above. Further, a second drive shaft extension assembly 400 is coupled to the first drive shaft extension assembly 400. That is, the second shaft coupling component 450 of the second drive shaft extension assembly 400 is coupled to the secondary coupling component 470 of the first drive shaft extension assembly 400. It is understood that in this configuration, the housing assemblies 410 of each drive shaft extension assembly 400 include additional housing coupling components structured to couple, and in an exemplary embodiment fix, the housing assemblies 410 together.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A drive shaft extension assembly for a electrical switching assembly said electrical switching assembly including an electrical switching apparatus, a cassette, and a base levering assembly, said base levering assembly including a drive shaft having an end including a first shaft coupling component, said drive shaft extension assembly comprising:
   a housing assembly;
   a shaft extension including an elongated body;
   a racking gear;
   said shaft extension body having a first end and a second end;
   said shaft extension body first end including a second shaft coupling component;
   said racking gear coupled to said shaft extension body second end;
   said shaft extension body rotatably disposed in said drive shaft extension assembly housing assembly; and
   wherein said shaft extension second shaft coupling component is structured to be coupled to said first shaft coupling component with said drive shaft and said shaft extension being aligned.

2. The drive shaft extension assembly of claim 1 wherein said second shaft coupling component is a fixed orientation coupling component.

3. The drive shaft extension assembly of claim 2 wherein said second shaft coupling component is a D-shaft coupling component.

4. The drive shaft extension assembly of claim 1 wherein said drive shaft extension assembly housing assembly includes a mounting assembly, said mounting assembly structured to rotatably support said shaft extension body.

5. The drive shaft extension assembly of claim 1 wherein said base levering assembly includes a frame with lateral sides and a first housing coupling component disposed on a frame lateral side, and wherein:
   said drive shaft extension assembly housing assembly includes a second housing coupling component; and
   said second housing coupling component structured to be coupled to said first housing coupling component and to fix said drive shaft extension assembly housing assembly to said electrical switching apparatus housing.

6. The drive shaft extension assembly of claim 1 wherein said shaft extension body second end includes a secondary coupling component, said secondary coupling component being substantially similar to said first shaft coupling component.

7. A levering assembly for an electrical switching apparatus, said electrical switching apparatus structured to be removably disposed in a cassette, said electrical switching apparatus including a housing, said cassette including two generally parallel lateral sidewalls and a first racking member and a second racking member, wherein one racking member is rotatably coupled to each lateral sidewall, said levering assembly comprising:
   a mounting member structured to be coupled to the electrical switching apparatus housing;
   a drive assembly including an elongated laterally extending drive shaft, said drive assembly coupled to said mounting member and being structured to cooperate with said cassette first and second racking members;
   said drive shaft having a first end and a second end;
   a drive shaft end including a first shaft coupling component;
   a drive shaft extension assembly including a housing assembly, an elongated shaft extension and a racking gear;
   said shaft extension body having a first end and a second end;
   said shaft extension body first end including a second shaft coupling component;
   said racking gear coupled to said shaft extension body second end;
   said shaft extension body rotatably disposed in said drive shaft extension assembly housing assembly;
   wherein said second shaft coupling component is coupled to said first shaft coupling component with said drive shaft and said shaft extension being aligned; and
   an actuator coupled to said mounting member and being structured to actuate said drive assembly to move said electrical switching apparatus with respect to said cassette.

8. The levering assembly of claim 7 wherein said second shaft coupling component is a fixed orientation coupling component.

9. The levering assembly of claim 8 wherein said second shaft coupling component is a D-shaft coupling component.

10. The levering assembly of claim 7 wherein said drive shaft extension assembly housing assembly includes a mounting assembly, said mounting assembly structured to rotatably support said shaft extension body.

11. The levering assembly of claim 7 wherein said electrical switching apparatus housing includes first housing coupling component and wherein:
    said drive shaft extension assembly housing assembly includes a second housing coupling component; and
    said second housing coupling component structured to be coupled to said first housing coupling component and to fix said drive shaft extension assembly housing assembly to said electrical switching apparatus housing.

12. The levering assembly of claim 7 wherein said shaft extension body second end includes a secondary coupling component, said secondary coupling component being substantially similar to said first shaft coupling component.

13. An electrical switching apparatus comprising:
    a housing; and
    a levering assembly structured to move said electrical switching apparatus into and out of a cassette, said levering assembly comprising:
    a mounting member structured to be coupled to the electrical switching apparatus housing;
    a drive assembly including an elongated laterally extending drive shaft, said drive assembly coupled to said mounting member and being structured to cooperate with said cassette first and second racking members;
    said drive shaft having a first end and a second end;
    a drive shaft end including a first shaft coupling component;
    a drive shaft extension assembly including a housing assembly, an elongated shaft extension and a racking gear;
    said shaft extension body having a first end and a second end;
    said shaft extension body first end including a second shaft coupling component;
    said racking gear coupled to said shaft extension body second end;
    said shaft extension body rotatably disposed in said drive shaft extension assembly housing assembly;

wherein said second shaft coupling component is coupled to said first shaft coupling component with said drive shaft and said shaft extension being aligned; and an actuator coupled to said mounting member and being structured to actuate said drive assembly to move said electrical switching apparatus with respect to said cassette.

14. The electrical switching apparatus of claim 13 wherein said second shaft coupling component is a fixed orientation coupling component.

15. The electrical switching apparatus of claim 14 wherein said second shaft coupling component is a D-shaft coupling component.

16. The electrical switching apparatus of claim 13 wherein said drive shaft extension assembly housing assembly includes a mounting assembly, said mounting assembly structured to rotatably support said shaft extension body.

17. The electrical switching apparatus of claim 13 wherein said electrical switching apparatus housing includes first housing coupling component and wherein:

said drive shaft extension assembly housing assembly includes a second housing coupling component; and said second housing coupling component structured to be coupled to said first housing coupling component and to fix said drive shaft extension assembly housing assembly to said electrical switching apparatus housing.

18. The electrical switching apparatus of claim 13 wherein said shaft extension body second end includes a secondary coupling component, said secondary coupling component being substantially similar to said first shall coupling component.

19. A drive shaft extension assembly for an electrical switching assembly said electrical switching assembly including an electrical switching apparatus, a cassette, and a base levering assembly, said electrical switching apparatus structured to be removably disposed in said cassette, said cassette including two generally parallel lateral sidewalls and a first racking member and a second racking member, wherein one racking member is rotatably coupled to each lateral sidewall, said electrical switching apparatus including a housing and a levering assembly, said base levering assembly including a mounting member, a drive assembly and an actuator, said mounting member coupled to the electrical switching apparatus housing, said drive assembly including an elongated laterally extending drive shaft, said drive assembly coupled to said mounting member and being structured to cooperate with said cassette first and second racking members, said drive shaft having a first end and a second end, a drive shaft end including a first shaft coupling component, said actuator coupled to said mounting member and being structured to actuate said drive assembly to move said electrical switching apparatus with respect to said cassette, said drive shaft extension assembly comprising:

a housing assembly;
a shaft extension including an elongated body;
a racking gear;
said shaft extension body having a first end and a second end;
said shaft extension body first end including a second shaft coupling component;
said racking gear coupled to said shaft extension body second end;
said shaft extension body rotatably disposed in said drive shaft extension assembly housing assembly; and
wherein said second shaft coupling component is structured to be coupled to said first shaft coupling component with said drive shaft and said shaft extension being aligned.

* * * * *